United States Patent [19]

Bornemann et al.

[11] Patent Number: 5,031,507
[45] Date of Patent: Jul. 16, 1991

[54] VACUUM BRAKE FORCE BOOSTER WITH BOOSTER-SIDE VALVE AIR INTAKE

[75] Inventors: Horst Bornemann, Hofheim; Albin Loew, Karben, both of Fed. Rep. of Germany

[73] Assignee: Alfred Teves GmbH, Frankfurt am Main, Fed. Rep. of Germany

[21] Appl. No.: 554,307

[22] Filed: Jul. 17, 1990

[30] Foreign Application Priority Data

Jul. 19, 1989 [DE] Fed. Rep. of Germany ....... 3923843

[51] Int. Cl.$^5$ ............................................. B60T 13/52
[52] U.S. Cl. ................ 91/369.1; 91/376 R; 92/78
[58] Field of Search .................. 91/368, 369.1, 369.2, 91/376 R; 92/78; 137/627.5

[56] References Cited

U.S. PATENT DOCUMENTS

| | | | |
|---|---|---|---|
| 3,727,516 | 4/1973 | Myers et al. | 91/376 R |
| 3,921,501 | 11/1975 | Rosback | 91/376 R |
| 4,587,884 | 5/1986 | Tsubouchi | 91/376 R X |
| 4,716,814 | 1/1988 | Yamakoshi | 92/78 X |

FOREIGN PATENT DOCUMENTS 3900416 1/1989 Fed. Rep. of Germany .

Primary Examiner—Edward K. Look
Assistant Examiner—George Kapsalas
Attorney, Agent, or Firm—Robert P. Seitter; J. Gordon Lewis

[57] ABSTRACT

A boot (19) protecting the pedal-sided end (18) of the control valve housing (5) of a vacuum brake force booster is fixed by a spacer. The spacer is preferably configured as a dual-walled annular sleeve (20). It is axially secured in the same position as a ring sealing the control valve housing (5) against the booster housing (1). An axial extension (26) of sleeve (20) insures that the boot (19) is kept remote from the booster housing (1) and from the control valve housing (5), respectively, so that air can be taken in between boot (19) and control valve housing (5) for ventilating the working chamber (3). This design allows the air required for ventilation to travel very closely to the baffle wall, thereby minimizing noise in the passenger cabin of the automobile.

8 Claims, 1 Drawing Sheet

U.S. Patent July 16, 1991 5,031,507
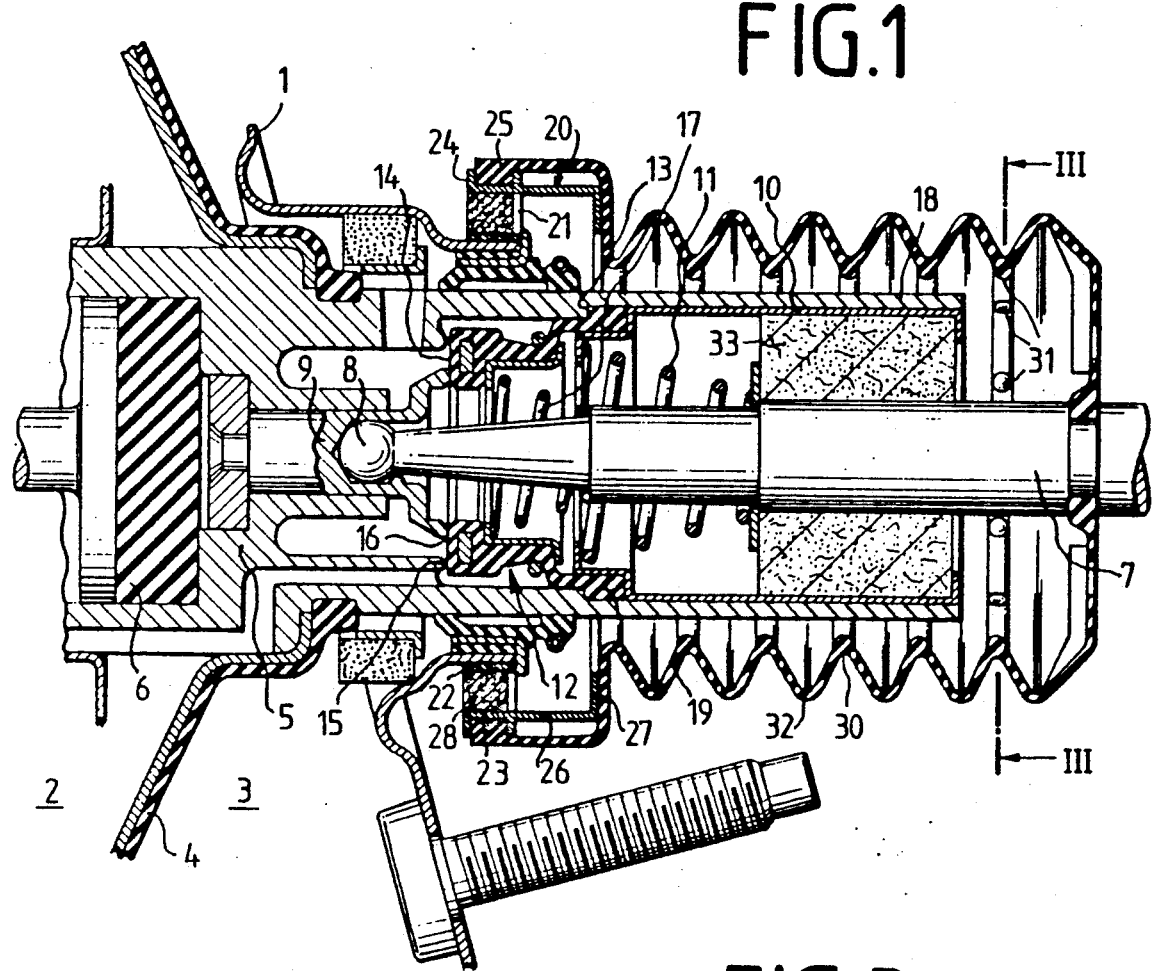
FIG.1
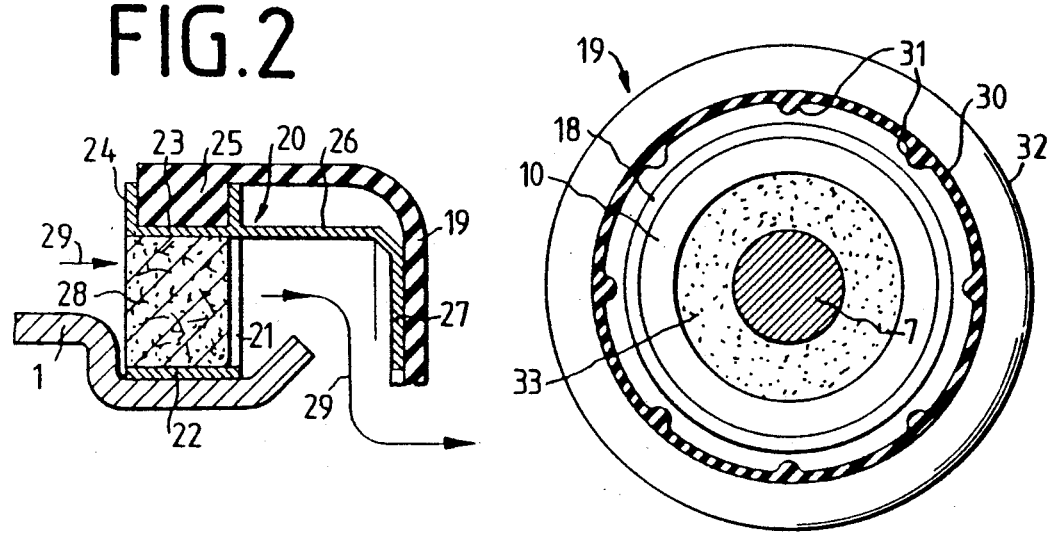
FIG.2
FIG.3

VACUUM BRAKE FORCE BOOSTER WITH BOOSTER-SIDE VALVE AIR INTAKE

BACKGROUND OF THE INVENTION

1. Technical Field

The present invention relates to a vacuum brake force booster comprising, in a booster housing, a vacuum chamber of a constant pressure, a working chamber of a variable pressure, and a control valve located in a control valve housing. One end of the control valve housing protrudes from the booster and is protected by a boot. On one end, the boot is sealingly fixed to the booster housing through a spacer. On its opposite end, the boot is sealingly secured to a piston rod serving as a control valve actuator.

2. Description of the Prior Art

In conventional brake force boosters of the afore-described type, the air required for ventilating the work chamber is passed through pedal-sided openings in the boot into the control valve housing. Although this way of ventilating is very simple, it usually means that the air is taken from the passenger cabin, thus creating substantial noise and causing inconvenience to the passengers.

Another brake force booster is shown in German patent application Ser. No. P 39 00 446.3. In that booster, only the portion of the booster housing facing the control valve housing is surrounded by a sheet metal tube. The boot is secured to the tube in order to draw in air. Manufacture and assembly of the tube are costly and complex. Moreover, the weight of the brake force booster is increased.

SUMMARY OF THE INVENTION

Therefore, the object of the present invention is to provide an improved vacuum brake force booster which can be manufactured more easily and less expensively than known boosters, causes less disturbing noise in the passenger cabin, and offers a reduction in weight.

This object is achieved, according to the present invention, by insuring that the booster-sided end of the boot is always spaced away from the control valve housing. Accordingly, air is permitted to flow between the boot and housing, thus assuring that the air for ventilating the working chamber will be drawn adjacent the baffle wall and that minimal noise will reach the car passengers. In addition, a single, simply designed element affixes the boot, for example, by snapping over an annular bead on the boot. Such a design is adequate to insure ventilation. The spacer can be configured as a sleeve in a particularly simple design, which, in part, is dual-walled. In that case, the air is drawn through the slot formed between the two walls.

Preferably, an axial extension is formed on the sleeve. The extension will always keep an air passage gap open between the booster housing or control valve housing and the boot, thereby eliminating the need for the boot to be so rigidly configured as to prevent it from sealing the air gap.

More particularly, in the preferred embodiment of the present invention, an air filter or silencer is provided in the dual-walled section of the sleeve, thereby optimally exploiting available space and foregoing additional assembly elsewhere.

The sleeve may be made of a plastic material. If so, it is particularly inexpensive and easy to manufacture, providing a particularly light-weight configuration.

According to a further advantageous embodiment of the present invention in which the boot is snapped into the sleeve, the inner side of the wrinkles of small diameter is furnished with nubs or webs. These nubs or webs prevent the elastic material of the wrinkling boot from sealingly conforming to the control valve housing and thereby precluding air from being drawn into the working chamber.

Further details and advantages of a vacuum brake force booster constructed in accordance with the present invention will become evident from the following description with reference to the accompanying drawings.

BRIEF DESCRIPTION OF THE DRAWINGS

FIG. 1 shows a longitudinal cross-section through the control valve housing a vacuum brake force booster comprising the sleeve and filter element of the present invention; FIG. 2 is a detailed section of the sleeve, illustrating the filter and the boot in place; and FIG. 3 shows a section taken along the line III—III of FIG. 1, illustrating the nubs on the interior of the boot.

DETAILED DESCRIPTION OF THE PREFERRED EMBODIMENT

FIG. 1 shows the booster housing 1 with the vacuum chamber 2 and the working chamber 3. The pressure inside chamber 3 is variable. The two chambers 2 and 3 are separated from one another by the movable wall 4. The tubular control valve housing 5 protruding into the booster housing 1 engages the working piston 6 to align piston 6. The piston rod 7 penetrates the control valve housing 5 in the housing center. On one side of piston rod 7, the brake pedal (not shown) activates, directly or indirectly, piston rod 7. Spherical end 8 of rod 7 opposite the brake pedal protrudes into the control piston 9. Provided in the control valve housing 5 is a sleeve 10 on which a compression spring 11 is supported and through which the piston rod 7 is held in the release position. Moreover, the sleeve 10 holds the control valve 12 against a projection 13 on the control valve housing 5. The sealing face 14 of the control valve 12 cooperates with the two valve seats 15 and 16 and is forced by the control valve spring 17, supported on the piston rod 7, against the valve seats 15, 16.

On the pedal-sided end of the control valve housing 5, end 18 protrudes from the booster housing 1 and is surrounded by a boot 19, thereby protecting it against dirt and moisture. The boot 19 is snapped onto the piston rod 7 on one end and, on the opposite end closest the booster housing 1, is fixed to an annular, partly dual-walled sleeve 20. FIG. 2 shows, in enlarged scale, the fixation of boot 19 to sleeve 20.

As shown in FIG. 2, the sleeve 20 engages the booster housing I. The outer annular wall 23 of sleeve 20 is attached, through a discontinued connecting web 21, to an internal annular wall 22 which abuts booster housing 1. Located on the outer annular wall 23 are radial extensions 24 which surround an annular bead 25 of the boot 19. The outer annular wall 23 has an axial extension 26 projecting toward the pedal and keeping the boot 19 remote from the booster housing I and from the control valve housing 5. The extension 26 terminates in an inwardly extending molded ring 27. Ring 27 directs the air which ventilates the working chamber 3 between the control valve housing 5 and the boot 19 enabling it to be passed from the pedal-sided end of the control valve housing 5 past control valve 12 into the working chamber 3. Provided between the inner and outer annular walls 22, 23 is an annular filter element 28 for purifying the indrawn air, the flow of which is shown by the arrows 29. The filter 28, simultaneously or selectively, may serve as a silencer.

FIG. 3 sectionally shows—as illustrated in FIG. 1—the boot 19. Molded to the internal wall of boot 19 in the area of the small-diameter wrinkles 30, are nubs 31. Also shown in FIG. 3 are larger-diameter wrinkles 32, end 18 of control valve housing 5, sleeve 10, another air filter 33 located in the control valve housing 5, and piston rod 7.

What is claimed is:
1. A vacuum brake force booster comprising:
   a booster housing;
   a vacuum chamber of constant pressure within said booster housing;
   a working chamber of variable pressure within said booster housing;
   a control valve housing within said booster housing and having an end protruding from said booster housing;
   a control valve within said control valve housing;
   a ring sealing said control valve housing against said booster housing;
   a piston rod for actuating said control valve;
   a boot surrounding said end of said control valve housing protruding from said booster housing;
   means for sealingly securing a first end of said boot to said piston rod;
   and a spacer sealingly securing a second end of said boot to said booster housing in the same axial position as said ring and having an air flow passage enabling air to flow between said boot and said control valve housing to ventilate said working chamber.

2. A vacuum brake force booster as claimed in claim 1 wherein said piston rod is adapted to be coupled to and activated by a brake pedal and said spacer is axially positioned on the end of said booster housing closest to said brake pedal.

3. A vacuum brake force booster as claimed in claim 1 wherein said spacer is a partly dual-walled sleeve.

4. A vacuum brake force booster as claimed in claim 3 wherein said spacer further comprises an axial extension for spacing said boot from said booster housing and said control valve housing.

5. A vacuum brake force booster as claimed in claim 1 wherein said spacer encloses an element selected from the group consisting of sound-absorbers and airfilters.

6. A vacuum brake force booster as claimed in claim 1 wherein said spacer is made of plastic.

7. A vacuum brake force booster comprising:
   a booster housing;
   a vacuum chamber of constant pressure within said booster housing;
   a working chamber of variable pressure within said booster housing;
   a control valve housing within said booster housing and having an end protruding from said booster housing;
   a control valve within said control valve housing;
   a ring sealing said control valve housing against said booster housing;
   a piston rod for actuating said control valve;
   a boot surrounding said end of said control valve housing protruding from said booster housing;
   means for sealing securing a first end of said boot to said piston rod;
   said a spacer sealingly securing a second end of said boot to said booster housing in the same axial position as said ring, said spacer having;
   (a) an air flow passage enabling air to flow between said boot and said control valve housing to ventilate said working chamber,
   (b) an outer annular wall, and
   (c) an internal annular wall,
   said two walls defining an area for accommodating an element selected from the group consisting of sound-absorbers and air-filters.

8. A vacuum brake force booster comprising:
   a booster housing;
   a vacuum chamber of constant pressure within said booster housing;
   a working chamber of variable pressure within said booster housing;
   a control valve housing within said booster housing and having an end protruding from said booster housing;
   a control valve within said control valve housing;
   a ring sealing said control valve housing against said booster housing;
   a piston rod for actuating said control valve;
   a boot surrounding said end of said control valve housing protruding from said booster housing and including nubs on its internal circumference for preventing said boot from sealingly conforming to said control valve housing during intake of air into said working chamber, whereby air flow between said boot and said control valve housing is assured;
   means for sealingly securing a first end of said boot to said piston rod;
   and a spacer sealingly securing a second end of said boot to said booster housing in the same axial position as said ring and having an air flow passage enabling air to flow between said boot and said control valve housing to ventilate said working chamber.

* * * * *